(12) United States Patent
Peters et al.

(10) Patent No.: US 11,137,775 B2
(45) Date of Patent: Oct. 5, 2021

(54) UNMANNED AERIAL VEHICLE

(71) Applicant: BASF SE, Ludwigshafen am Rein (DE)

(72) Inventors: Ole Peters, Langenfeld (DE); Holger Hoffmann, Langenfeld (DE)

(73) Assignee: BASF SE, Ludwigshafen am Rein (DE)

( * ) Notice: Subject to any disclaimer, the term of this patent is extended or adjusted under 35 U.S.C. 154(b) by 0 days.

(21) Appl. No.: 16/755,913

(22) PCT Filed: Oct. 12, 2018

(86) PCT No.: PCT/EP2018/077901
§ 371 (c)(1),
(2) Date: Apr. 14, 2020

(87) PCT Pub. No.: WO2019/076759
PCT Pub. Date: Apr. 25, 2019

(65) Prior Publication Data
US 2020/0244890 A1    Jul. 30, 2020

(30) Foreign Application Priority Data

Oct. 17, 2017   (EP) .................................... 17196818
Oct. 17, 2017   (EP) .................................... 17196819

(51) Int. Cl.
G05D 1/10      (2006.01)
B64C 39/02     (2006.01)
(Continued)

(52) U.S. Cl.
CPC ........... G05D 1/101 (2013.01); B64C 39/024 (2013.01); B64D 47/08 (2013.01); G05D 1/0094 (2013.01);
(Continued)

(58) Field of Classification Search
CPC .. G05D 1/101; G05D 1/0094; H04N 5/23299; H04N 7/18; G06K 9/00657;
(Continued)

(56) References Cited

U.S. PATENT DOCUMENTS

2017/0075351 A1*  3/2017  Liu ....................... H04N 5/2251
2017/0223947 A1*  8/2017  Gall .................... G01N 21/4738
(Continued)

FOREIGN PATENT DOCUMENTS

EP    2772814 A2    9/2014
WO    01/68447      9/2001
(Continued)

OTHER PUBLICATIONS

International Search Report and Written Opinion for International Application No. PCT/EP2018/077901 dated Dec. 12, 2018, 11 pgs.
(Continued)

*Primary Examiner* — Joseph G Ustaris
*Assistant Examiner* — Jill D Sechser
(74) *Attorney, Agent, or Firm* — Lowenstein Sandler LLP

(57) ABSTRACT

The present invention relates to unmanned aerial vehicle for agricultural field assessment. It is described to fly (210) the unmanned aerial vehicle to a location in a field containing a crop. A body of the unmanned aerial vehicle is positioned (220) in a substantially stationary aspect above the crop at the location. A camera of the unmanned aerial vehicle is moved (230) vertically with respect to the body of the unmanned aerial vehicle between a first position and a second position, wherein the first position is closer to the body of the unmanned aerial vehicle than the second position. The camera acquires (240) at least one image relating to the crop when the camera is not in the first position.

14 Claims, 5 Drawing Sheets

(51) Int. Cl.
*B64D 47/08* (2006.01)
*G05D 1/00* (2006.01)
*H04N 5/232* (2006.01)
*G06K 9/00* (2006.01)
*H04N 7/18* (2006.01)
*A01G 7/00* (2006.01)

(52) U.S. Cl.
CPC ..... *G06K 9/00657* (2013.01); *H04N 5/23299* (2018.08); *H04N 7/18* (2013.01); *A01G 7/00* (2013.01); *B64C 2201/027* (2013.01); *B64C 2201/123* (2013.01)

(58) Field of Classification Search
CPC ............ B64C 39/024; B64C 2201/027; B64C 2201/123; B64D 47/08; A01G 7/00; A01M 31/002
See application file for complete search history.

(56) References Cited

U.S. PATENT DOCUMENTS

| | | | |
|---|---|---|---|
| 2017/0231213 A1 | 8/2017 | Gordon | |
| 2018/0156770 A1* | 6/2018 | Saez | G01N 33/24 |
| 2019/0227554 A1* | 7/2019 | Cantrell | G05D 1/0088 |
| 2020/0108914 A1* | 4/2020 | Yoo | G05D 1/0808 |
| 2020/0241568 A1* | 7/2020 | Peters | B64C 39/024 |
| 2020/0278696 A1* | 9/2020 | Miller | G05D 1/0669 |

FOREIGN PATENT DOCUMENTS

| | | |
|---|---|---|
| WO | WO 2014122256 A1 * | 2/2014 |
| WO | 2014/106814 | 7/2014 |
| WO | 2016/025848 | 2/2016 |
| WO | WO-2016/123201 A1 | 8/2016 |
| WO | 2017/041304 | 3/2017 |
| WO | 2017/073300 | 5/2017 |
| WO | WO-2020165027 A1 * | 8/2020 |

OTHER PUBLICATIONS

Zhang et al., "The application of small unmanned aerial systems for precision agriculture: a review", Precision Agriculture, Jul. 31, 2012, pp. 693-712, vol. 13, No. 6, Kluwer Academic Publishers, BO., 20 pages.
Corcoles, et al., "Estimation of leaf area index in onion (*Allium cepa* L.) using an unmanned aerial vehicle", Biosystems Engineering, vol. 115, Issue 1, May 2013, pp. 31-42.
European Search Report for EP Patent Application No. 17196818.3, dated Apr. 5, 2018, 3 pages.
European Search Report for EP Patent Application No. 17196819.1, dated Apr. 11, 2018, 3 pages.
Sugura, et al., "Remote-sensing Technology for Vegetation Monitoring using an Unmanned Helicopter", Biosystems Engineering, vol. 90, Issue 4, Apr. 2005, pp. 369-379.
Nathalie J. J. Bréda, "Groundbased measurements of leaf area index: a review of methods, instruments and current controversies", Journal of Experimental Botany, vol. 54, Issue 392, Nov. 1, 2003, pp. 2403-2417.

* cited by examiner

UNMANNED AERIAL VEHICLE

FIELD OF THE INVENTION

The present invention relates to an unmanned aerial vehicle for agricultural field assessment, and to a method for agricultural field assessment, as well as to a computer program element.

BACKGROUND OF THE INVENTION

The general background of this invention is the assessing of a field status in terms of weeds, diseases and pests, as well as assessing ecophysiology through for example the determination of a leaf area index (LAI). Presently remote sensing and unmanned aerial vehicles such as drones do not acquire imagery at the required resolution and quality in order to perform the required image diagnostics. Additionally, it is very time consuming for a farmer to enter a field and acquire the necessary image data.

SUMMARY OF THE INVENTION

It would be advantageous to have improved means for agricultural field assessment.

The object of the present invention is solved with the subject matter of the independent claims, wherein further embodiments are incorporated in the dependent claims. It should be noted that the following described aspects and examples of the invention apply also for the unmanned aerial vehicle for agricultural field assessment, the method for agricultural field assessment, and for the computer program element.

According to a first aspect, there is provided an unmanned aerial vehicle for agricultural field assessment, comprising:
 a control unit; and
 a camera.

The camera is configured to be moved vertically with respect to a body of the unmanned aerial vehicle between a first position and a second position. The first position is closer to the body of the unmanned aerial vehicle than the second position. The control unit is configured to fly the unmanned aerial vehicle to a location in a field containing a crop. The control unit is configured also to position the body of the unmanned aerial vehicle in a substantially stationary aspect above the crop at the location. When the body of the unmanned aerial vehicle is in the substantially stationary aspect above the crop at the location, the control unit is configured also to move the camera vertically. When the body of the unmanned aerial vehicle is in the substantially stationary aspect above the crop at the location, the control unit is configured also to control the camera to acquire at least one image relating to the crop when the camera is not in the first position.

In other words, an unmanned aerial vehicle (UAV) such as a drone flies to a part of a field, positions its body in a resting position above the crop, for example by landing on legs that are attached to the body or by hovering in a stationary position above the crop, then a camera is lowered toward the crop and can be lowered into the crop. While being lowered and/or raised including when the camera is not moving, the camera can take pictures relating to the crop. These pictures can then be appropriately analysed to determine if there are weeds, diseases, pests, insects or other issues relating to the crop at that part of the field. Also, the pictures can provide information on the leaf canopy area and height, and in this way a leaf area index (LAI) for the crop at that location can be determined. The image data, which can then be analysed is acquired automatically in a reproducible manner, enabling results of for example the LAI to be accurately determined at that location and compared with values calculated at other parts (or locations) in the crop. Furthermore, by lowering the camera into the crop images can be acquired at various heights, including at ground level and above the canopy, and again with respect to LAI non-randomness in the canopy such as leaves sitting one on top of the other that leads to a reduction in the LAI determined can be mitigated because data can be acquired at various heights. By lowering the camera into the crop, diseases, pests, insect damage can be determined to be occurring, even when this is only evident at certain locations within the crop, such as close to the ground or at a mid-height in the crop. Thus, issues that could not otherwise be determined from an aerial examination can be determined from the imagery acquired.

The UAV can acquire data around a field, for example in a square like a 20 m×20 m pattern and land at those locations and acquire data. The UAV can also determine itself from image processing where to position itself to acquire data, or could be directed to a location by a user.

Thus, in addition to images being acquired that can be used to determine LAIs, the images can be used to determine weeds, diseases, pests, insects and insect damage, enabling remedial action to be taken. In this way, this data can be acquired quicker, more accurately, and with greater accuracy than present techniques using remote sensing or aerial images from a drone or that require a human operator to enter a field and manually acquire the required relevant data.

In an example, the at least one image relating to the crop comprises at least one image acquired when the camera is within the canopy of the crop.

In this way, a weed, diseases, pests, insects and/or insect damage can be more effectively detected on the basis of image processing of acquired images, and weeds determined and identified more accurately. Also, by acquiring images within the canopy, a leaf area index (LAI) can also be determined from the acquired imagery.

In an example, the at least one image comprises a plurality of images and wherein the control unit is configured to control the camera to acquire the plurality of images at a corresponding plurality of different positions that are not the first position.

Thus, by acquiring images at different heights, localised disease, pests, insects and/or insect damage for example within particular plants of the crop can be detected from such imagery. Also, a leaf area index can be more accurately determined because it can be based on more than one image from within the crop at different heights, and mitigate effects such as leaf overlap that can otherwise lead to an underestimation of a LAI value.

In an example, the control unit is configured to control the camera to acquire at least one image of the at least one image relating to the crop when the camera is in the second position.

In other words, imagery can be acquired when the camera has moved to a furthest position away from the body of the UAV (drone).

In an example, the second position comprises the ground.

In other words, the UAV lowers a camera into a crop all the way to the ground, and imagery can be acquired from that ground position. In this way, not only can imagery be acquired at all points within a crop from above the crop to all the way to the ground, by acquiring imagery from the ground a reference height for this image and all the other images can be determined with reference to the ground. To put this another way, the height of all images above the ground can be determined. Thus, the height of the crop can be determined and the height at which diseases and/or insect damage can be determined. Also, the height of images acquired to be used for a LAI measurement can be determined providing for a more accurate LAI value determination.

In an example, the control unit is configured to control the camera to acquire at least one image relating to the crop when the camera is in the first position.

In this way, imagery from above the crop can be acquired to provide a reference value used in determining a LAI value. Reference values for LAI measurements can also be acquired when the camera has moved away from the first position. Also, the camera can be used when the UAV is flying normally, as part of normal flying of the UAV and to acquire images that, for example, can be used to determine the location in the field above which the UAV will position itself in a substantially stationary aspect. The image from above the crop can also be used in determining if there are weeds, diseases, pest and insects and/or insect damage to vegetation.

In an example, a processing unit is configured to analyse the at least one image to determine a leaf area index for the crop.

In an example, a processing unit is configured to analyse the at least one image to determine at least one weed, and/or determine at least one disease, and/or determine at least one pest, and/or determine at least one insect, and/or determine at least one nutritional deficiency.

In an example, the unmanned aerial vehicle comprises the processing unit and/or the processing unit.

In an example, the unmanned aerial vehicle comprises at least one leg. The control unit is configured to land the unmanned aerial vehicle on the at least one leg at the location to position the body of the unmanned aerial vehicle in a substantially stationary aspect above the crop at the location.

In this manner, imagery of the crop can be acquired when the UAV has stopped or is feathering or has otherwise reduced the downdraught, and thus stream blowing of the leaves does not occur, and imagery can be used to more accurately determine diseases, weeds, pests, insects, insect damage and LAI values etc.

In an example, the unmanned aerial vehicle is configured to operate in a hover mode. The control unit is configured to hover the unmanned aerial vehicle at the location to position the body of the unmanned aerial vehicle in a substantially stationary aspect above the crop at the location.

Thus, the UAV does not need to land to acquire the imagery, but can hover above a location.

In an example, the camera when in the first position is configured to acquire at least one image relating to the field and/or a second camera of the unmanned aerial vehicle is configured to acquire the at least one image relating to the field. The processing unit is configured to analyse the at least one image relating to the field to determine the location in the field. The processing unit can be that which determines a LAI and/or that which determines weeds, diseases, pests, insects and insect damage etc. from acquired imagery. The processing unit can be external to the UAV or housed within the UAV, and the processing unit can be the control unit.

In this manner, before flying to the location the UAV can acquire imagery of the field and a determination can be made where to fly in order to position the UAV above the crop and acquire imagery. This can be via transmission of imagery to a processing unit external to the UAV that processes the imagery to determine the location, and that location is then transmitted back to the UAV. Or, the UAV can have the required processing power to analyse the imagery to determine the location. In this way, the UAV can operate in a semi-autonomous or completely autonomous manner.

In an example, the unmanned aerial vehicle comprises location determining means.

According to a second aspect, there is provided a method for agricultural field assessment, comprising:
 a) flying an unmanned aerial vehicle to a location in a field containing a crop;
 b) positioning a body of the unmanned aerial vehicle in a substantially stationary aspect above the crop at the location;
 c) moving a camera of the unmanned aerial vehicle vertically with respect to the body of the unmanned aerial vehicle between a first position and a second position, wherein the first position is closer to the body of the unmanned aerial vehicle than the second position; and
 d) acquiring by the camera at least one image relating to the crop when the camera is not in the first position.

According to another aspect, there is provided a computer program element for controlling the UAV of the first aspect, which when executed by a processor is configured to carry out the method of the second aspect.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
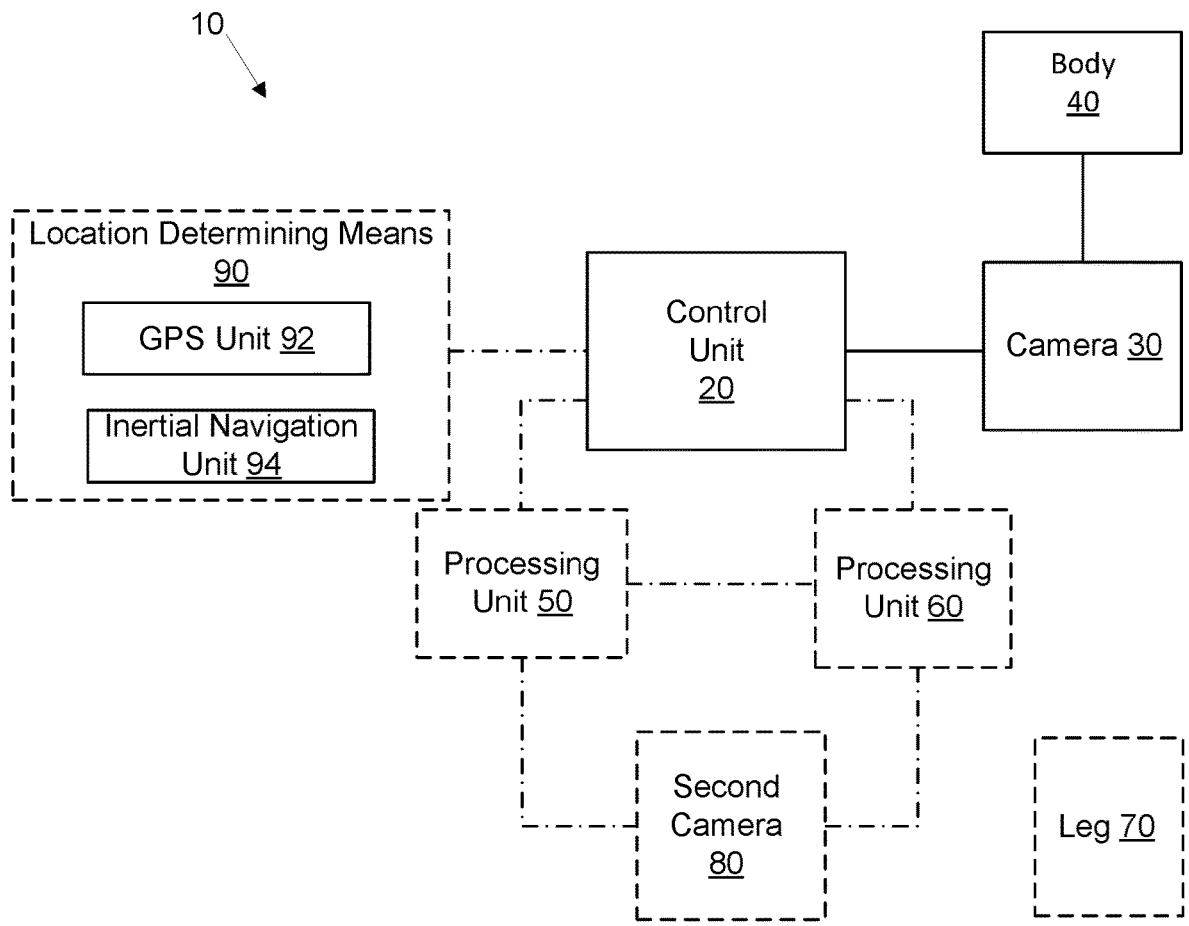
FIG. 1 shows a schematic set up of an example of an unmanned aerial vehicle for agricultural field assessment.

FIG. 1 shows an example of an unmanned aerial vehicle 10 for agricultural field assessment, where solid boxes represent essential features and dashed boxes represent optional features. The unmanned aerial vehicle 10 comprises a control unit 20 and a camera 30. The camera 30 is configured to be moved vertically with respect to a body 40 of the unmanned aerial vehicle 10 between a first position and a second position. The first position is closer to the body 40 of the unmanned aerial vehicle 10 than the second position. The control unit 20 is configured to fly the unmanned aerial vehicle 10 to a location in a field containing a crop. The control unit 20 is configured also to position the body 40 of the unmanned aerial vehicle 10 in a substantially stationary aspect above the crop at the location. When the body 40 of the unmanned aerial vehicle 10 is in the substantially stationary aspect above the crop at the location, the control unit 20 is configured to move the camera 30 vertically. Also when the body 40 of the unmanned aerial vehicle 10 is in the substantially stationary aspect above the crop at the location, the control unit 20 is configured to control the camera 30 to acquire at least one image relating to the crop when the camera 30 is not in the first position.

In an example, the camera is a 360 degree all around camera, or a camera that can image substantially 360 degrees.

In an example, the camera comprises a fisheye optical sensor, useable to enable a leaf area index (LAI) to be calculated from the imagery. In an example, the camera acquires image data at a number of different angles enabling canopy light interception to be determined at those number of different angles, from which a LAI can be computed.

In an example, the camera comprises a normal imaging sensor useable to image foliage at a resolution to enable image processing to determine a disease, weed, insect damage, or insect itself. The normal imaging sensor can also be used to determine an LAI.

In an example, the camera comprises both a fisheye optical sensor and a normal imaging sensor, and this way the camera is optimized for acquiring imagery for determining a LAI and for acquiring imagery for determining weeds, diseases, insect damage at the same time.

In an example, the camera is configured to acquire data below 500 nm, and in this way LAIs can be determined from the images more accurately.

In an example, the camera is configured to operate over the visible wavelength range. In an example, the camera is configured to operate in the near Infrared range. In an example, the camera is monochromatic. In an example, the camera is configured to acquire colour information such RGB. In an example, the camera is configured to acquire hyperspectral information. In this way, the analysis of the imagery to automatically detect diseases, pests, soil nutrients, yield factors (kernel size, number of spikes, numbers of ears of corn), weeds, insect damage and insects can be improved.

In an example, the control unit is configured to determine the distance the camera has moved away from the first position. This can be via by what length of cable has been laid out as the camera has been lowered, or via an acoustic sensor detecting the distance of the camera from the body of the UAV as it is lowered. Other distance movement techniques can be used, for example using a radar or laser sensor. This enables the position of the camera away from the body of the UAV when imagery is acquired to be determined.

According to an example, the at least one image relating to the crop comprises at least one image acquired when the camera is within the canopy of the crop.

According to an example, the at least one image comprises a plurality of images. The control unit is configured to control the camera to acquire the plurality of images at a corresponding plurality of different positions that are not the first position.

According to an example, the control unit is configured to control the camera to acquire at least one image of the at least one image relating to the crop when the camera is in the second position.

According to an example, the second position comprises the ground.

According to an example, the control unit is configured to control the camera to acquire at least one image relating to the crop when the camera is in the first position.

According to an example, a processing unit 50 is configured to analyse the at least one image to determine a leaf area index for the crop. Information on the determination of leaf area index can be found for example in N. J. Breda, "Ground-based measurements of the leaf area index: a review of methods, instruments and current controversies, Journal of Experimental Botany, Vol. 54, No. 392, pages 2403-2417 (2003), and from the following website www-.licor.com/env/products/leaf_area.

According to an example, a processing unit 60 is configured to analyse the at least one image to determine at least one weed, and/or determine at least one disease, and/or determine at least one pest, and/or determine at least one insect, and/or determine at least one nutritional deficiency.

In an example, the processing unit 50 is the processing unit 60. In other words, the same processing unit can be used to determine LAIs from acquired imagery and determine if there is a weed, or disease, or pest, or an insect or inset caused damage, or a nutritional deficiency.

In an example, the processing unit is configured to analyse the at least one image to determine at least one type of weed, and/or determine at least one type of disease, and/or determine at least one type of pest, and/or determine at least one type of insect, and/or determine of at least one type of nutritional deficiency.

Thus, an unmanned aerial vehicle such as a drone can fly around a field, become stationary, lower a camera and acquire images. On the basis of image processing of those images a determination can be made that there are weeds, and what the type of weed. The same applies for determination that there are pests, diseases, insects, nutritional deficiencies etc. Also, on the basis of image processing of acquired imagery an LAI associated with the crop at that location can be determined.

In an example, analysis of the at least one image comprises utilisation of a machine learning algorithm. This applies to the image processing to determine at least one weed, and/or determine at least one disease, and/or determine at least one pest, and/or determine at least one insect, and/or determine at least one nutritional deficiency.

In an example, the machine learning algorithm comprises a decision tree algorithm.

In an example, the machine learning algorithm comprises an artificial neural network.

In an example, the machine learning algorithm comprises an artificial neural In an example, the machine learning algorithm has been taught on the basis of a plurality of images. In an example, the machine learning algorithm has been taught on the basis of a plurality of images containing imagery of at least one type of weed, and/or at least of type of plant suffering from one or more diseases, and/or at least one type of plant suffering from insect infestation from one or more types of insect, and/or at least one type of insect (when the imagery has sufficient resolution), and/or at least one type of plant suffering from one or more pests, and/or at least one type of plant suffering from one or more types of nutritional deficiency. In an example, the machine learning algorithm has been taught on the basis of a plurality of images containing such imagery.

The imagery acquired by the camera 30 is at a resolution that enables one type of weed to be differentiated from another type of weed. The imagery can be at a resolution that enables pest or insect infested crops to be determined, either from the imagery of the crop itself or from acquisition of for examples insects themselves. The UAV (drone) can have a Global Positioning System (GPS) and this enables the location of acquired imagery to be determined. The drone can also have inertial navigation systems, based for example on laser gyroscopes. The inertial navigation systems can function alone without a GPS to determine the position of the drone where imagery was acquired, by determining movement away from a known or a number of known locations, such as a charging station. The camera passes the acquired imagery to the processing unit. Image analysis software operates on the processing unit. The image analysis software can use feature extraction, such as edge detection, and object detection analysis that for example can identify structures such in and around the field such as buildings, roads, fences, hedges, etc. Thus, on the basis of known locations of such objects, the processing unit can patch the acquired imagery to in effect create a synthetic representation of the environment that can in effect be overlaid over a geographical map of the environment. Thus, the geographical location of each image can be determined, and there need not be associated GPS and/or inertial navigation based information associated with acquired imagery. In other words, an image based location system can be used to locate the drone 10. However, if there is GPS and/or inertial navigation information available then such image analysis, that can place specific images at specific geographical locations only on the basis of the imagery, is not required. Although, if GPS and/or inertial navigation based information is available then such image analysis can be used to augment the geographical location associated with an image.

The processing unit therefore runs image processing software that comprises a machine learning analyser. Images of specific weeds are acquired, with information also relating to the size of weeds being used. Information relating to a geographical location in the world, where such a weed is to be found and information relating to a time of year when that weed is to be found, including when in flower etc. can be tagged with the imagery. The names of the weeds can also be tagged with the imagery of the weeds. The machine learning analyser, which can be based on an artificial neural network or a decision tree analyser, is then trained on this ground truth acquired imagery. In this way, when a new image of vegetation is presented to the analyser, where such an image can have an associated time stamp such as time of year and a geographical location such as Germany or South Africa tagged to it, the analyser determines the specific type of weed that is in the image through a comparison of imagery of a weed found in the new image with imagery of different weeds it has been trained on, where the size of weeds, and where and when they grow can also be taken into account. The specific location of that weed type on the ground within the environment, and its size, can therefore be determined.

The processing unit has access to a database containing different weed types. This database has been compiled from experimentally determined data.

The image processing software, using the machine learning algorithm, has also been taught to recognize insects, plants infested with insects, plants suffering from pests, and plants that are suffering from nutritional deficiencies and diseases. This is done in the same manner as discussed above, through training based on previously acquired imagery.

According to an example, the unmanned aerial vehicle comprises the processing unit 50 and/or the processing unit 60. In other words, in one or more examples the UAV 10 acquires imagery that is sent to one or more processors external to the UAV, and the image analysis is undertaken there. However, in this specific example the UAV itself has the required processing power to carry out this image analysis.

In an example the control unit and the processing unit 50 and/or processing unit 60 are the same unit. Thus, a central processor is responsible for controlling the UAV and its camera, and also for carrying out image analysis.

According to an example, the unmanned aerial vehicle comprises at least one leg 70. The control unit is configured to land the unmanned aerial vehicle on the at least one leg at the location to position the body of the unmanned aerial vehicle in a substantially stationary aspect above the crop at the location.

In an example, the at least one leg comprises three legs. In an example, the leg(s) can be made from lightweight carbon sticks. In an example, the leg(s) can be 1 m long, or other lengths enabling the body of the UAV to be above the canopy of the crop when the UAV lands. Different length legs could be used, and could be of different length with respect to different crops being interrogated.

According to an example, the unmanned aerial vehicle is configured to operate in a hover mode. The control unit is configured to hover the unmanned aerial vehicle at the location to position the body of the unmanned aerial vehicle in a substantially stationary aspect above the crop at the location.

According to an example, the camera when in the first position is configured to acquire at least one image relating to the field and/or a second camera 80 of the unmanned aerial vehicle is configured to acquire the at least one image relating to the field. The processing unit is configured to analyse the at least one image relating to the field to determine the location in the field.

In an example, the UAV can acquire imagery and that imagery can be analyzed to determine a regular grid, or for example 20 m by 20 m, and the UAV then flies to and acquires imagery at locations associated with such a grid.

In an example, the UAV can acquire imagery, and that imagery can be analyzed to determine areas that could for example be suffering from a disease or insect damage, or whether there is a weed at that location. The UAV can then fly to that location, and acquire imagery that can be analysed to provide an accurate determination as to whether there is a disease, insect damage or weed. In this way, imagery can be acquired, which indicates that a part of the crop in the field is discoloured or of stunted growth or otherwise look abnormal, and the imagery of the field can be analysed to determine that the UAV should position itself at locations where the crop is abnormal.

According to an example, the unmanned aerial vehicle comprises location determining means 90.

In an example, the location determining means is configured to provide the control unit with at least one location associated with the camera when the at least one image relating to the crop was acquired.

The location can be a geographical location, with respect to a precise location on the ground, or can be a location on the ground that is referenced to another position or positions on the ground, such as a boundary of a field or the location of a drone docking station or charging station. In other words, an absolute geographical location can be utilized or a location on the ground that need not be known in absolute terms, but that is referenced to a known location can be used.

In an example, the location is an absolute geographical location.

In an example, the location is a location that is determined with reference to a known location or locations.

In other words, an image can be determined to be associated with a specific location on the ground, without knowing its precise geographical position, but by knowing the location where an image was acquired with respect to known position(s) on the ground the location where imagery was acquired can be logged. In other words, absolute GPS derived locations of where the UAV has acquired imagery of a crop could be provided, and/or the locations of where imagery was acquired relative to a known position such as a field boundary or position of a charging station for the UAV could be provided, which again enables the farmer to determine the exact positions where imagery was acquired because they would know the absolute position of the filed boundary or charging station.

In an example, a GPS unit 92 is used to determine, and/or is used in determining, the location, such as the location of the camera when specific images were acquired.

In an example, an inertial navigation unit 94 is used alone, or in combination with a GPS unit, to determine the location, such as the location of the camera when specific images were acquired. Thus for example, the inertial navigation unit, comprising for example one or more laser gyroscopes, is calibrated or zeroed at a known location (such as a drone docking or charging station) and as it moves with the at least one camera the movement away from that known location in x, y, and z coordinates can be determined, from which the location of the at least one camera when images were acquired can be determined.

Figure 2:
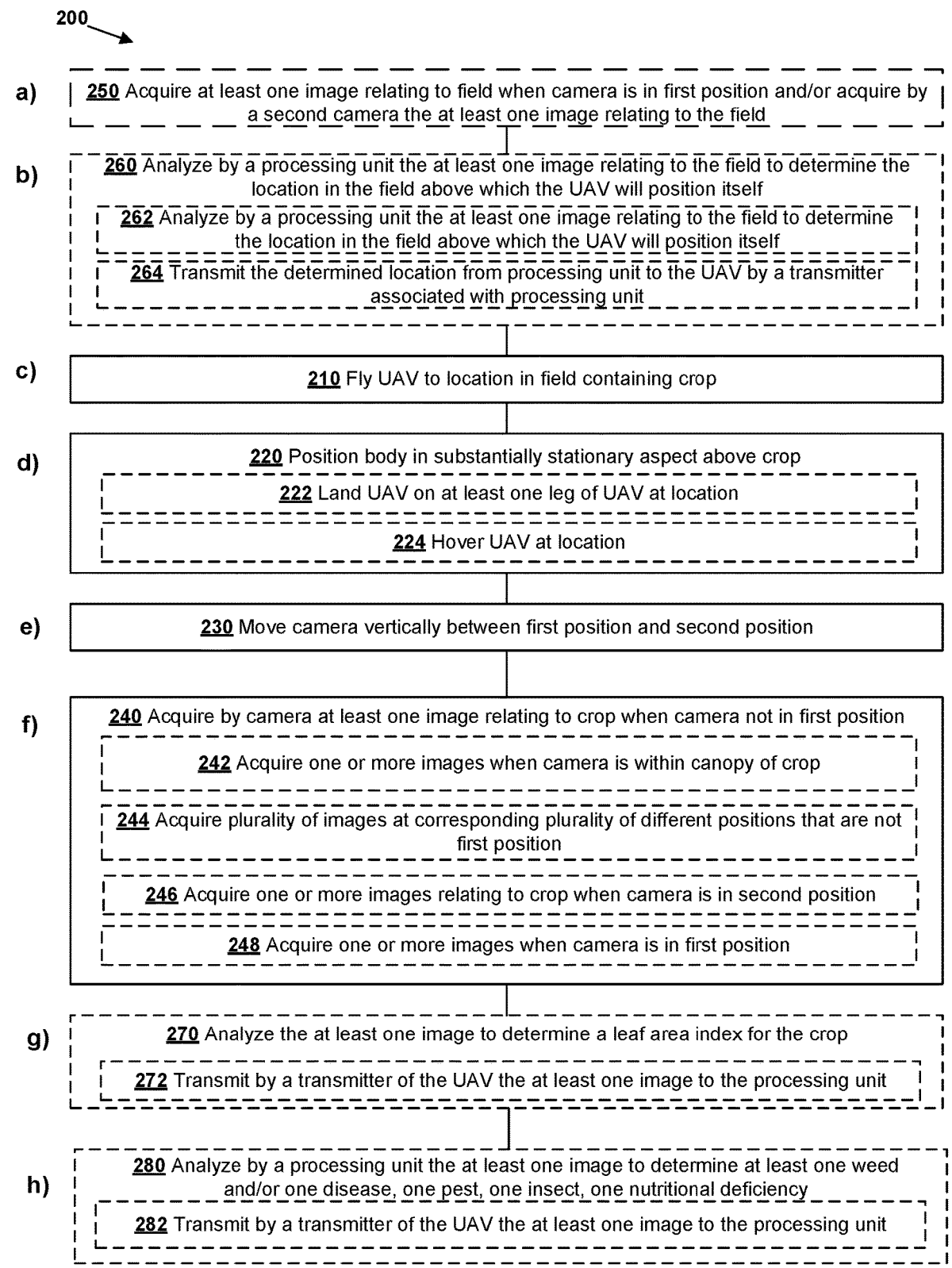
FIG. 2 shows a method for agricultural field assessment.

FIG. 2 shows a method 200 for agricultural field assessment in its basic steps where solid boxes represent essential steps and dashed boxes represent optional steps. The method 200 comprises:

in a flying step 210, also referred to as step c), flying an unmanned aerial vehicle to a location in a field containing a crop;

in a positioning step 220, also referred to as step d), positioning a body of the unmanned aerial vehicle in a substantially stationary aspect above the crop at the location;

in a moving step 230, also referred to as step e), moving a camera of the unmanned aerial vehicle vertically with respect to the body of the unmanned aerial vehicle between a first position and a second position, wherein the first position is closer to the body of the unmanned aerial vehicle than the second position; and in an acquiring step 240, also referred to as step f), acquiring by the camera at least one image relating to the crop when the camera is not in the first position.

In an example, a control unit of the unmanned aerial vehicle is configured to control the UAV to carry out step c).

In an example, a control unit of the unmanned aerial vehicle is configured to control the UAV to carry out step d).

In an example, a control unit of the unmanned aerial vehicle is configured to control the UAV to carry out step e).

In an example, a control unit of the unmanned aerial vehicle is configured to control the UAV to carry out step f).

In an example, the same control unit of the unmanned aerial vehicle is configured to control the UAV to carry out steps c), d), e) and f).

In an example step f) comprises acquiring 242 one or more images of the at least one image when the camera is within the canopy of the crop.

In an example, in step f) the at least one image comprises a plurality of images and wherein step f) comprises acquiring 244 the plurality of images at a corresponding plurality of different positions that are not the first position.

In an example, step f) comprises acquiring 246 one or more images of the of the at least one image relating to the crop when the camera is in the second position. In an example, the second position comprises the ground.

In an example, step f) comprises acquiring 248 one or more images of the at least one image relating to the crop when the camera is in the first position.

In an example, the method comprises step a), acquiring 250 at least one image relating to the field when the camera is in the first position and/or acquiring by a second camera of the unmanned aerial vehicle the at least one image relating to the field.

In an example, a control unit of the unmanned aerial vehicle is configured to control the UAV to carry out step a).

In an example, following step a) the method comprises step b), analysing 260 by a processing unit the at least one image relating to the field to determine the location in the field above which the UAV will position itself.

In an example, the UAV comprises the processing unit. In an example, the processing unit is the control unit of the UAV.

In an example, the processing unit is external to the UAV and step b) comprises transmitting 262 by a transmitter of the UAV the at least one image to the processing unit, and transmitting 264 the determined location from the processing unit to the UAV by a transmitter associated with the processing unit, to be used by the UAV in carrying out step c).

In an example, the method comprises step g) analysing 270 by a processing unit the at least one image to determine a leaf area index for the crop.

In an example, the UAV comprises the processing unit. In an example, the processing unit is the control unit of the UAV.

In an example, the processing unit is external to the UAV and step g) comprises transmitting 272 by a transmitter of the UAV the at least one image to the processing unit.

In an example, the method comprises step h) analysing 280 by a processing unit the at least one image to determine at least one weed, and/or determine at least one disease, and/or determine at least one pest, and/or determine at least one insect, and/or determine at least one nutritional deficiency.

In an example, the UAV comprises the processing unit. In an example, the processing unit is the control unit of the UAV. In an example the processing unit is the processing unit that can determine a LAI from imagery.

In an example, the processing unit is external to the UAV and step h) comprises transmitting 282 by a transmitter of the UAV the at least one image to the processing unit.

In an example, step d) comprises landing 222 the unmanned aerial vehicle on at least one leg of the unmanned aerial vehicle at the location.

In an example, step d) comprises hovering 224 the unmanned aerial vehicle at the location. In an example, of the method the unmanned aerial vehicle comprises location determining means.

Figure 3:
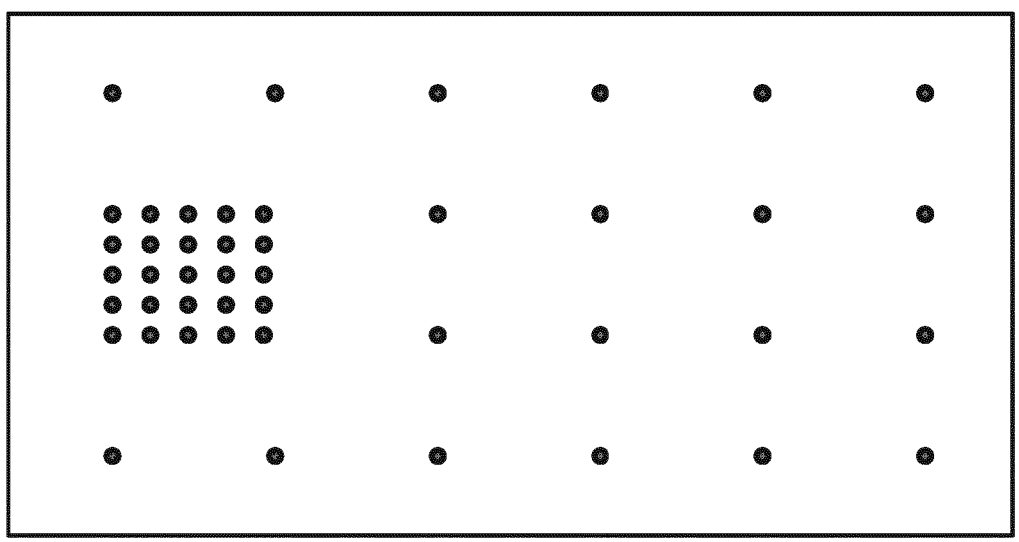
FIG. 3 shows a schematic representations of locations in a field.
Figure 4:
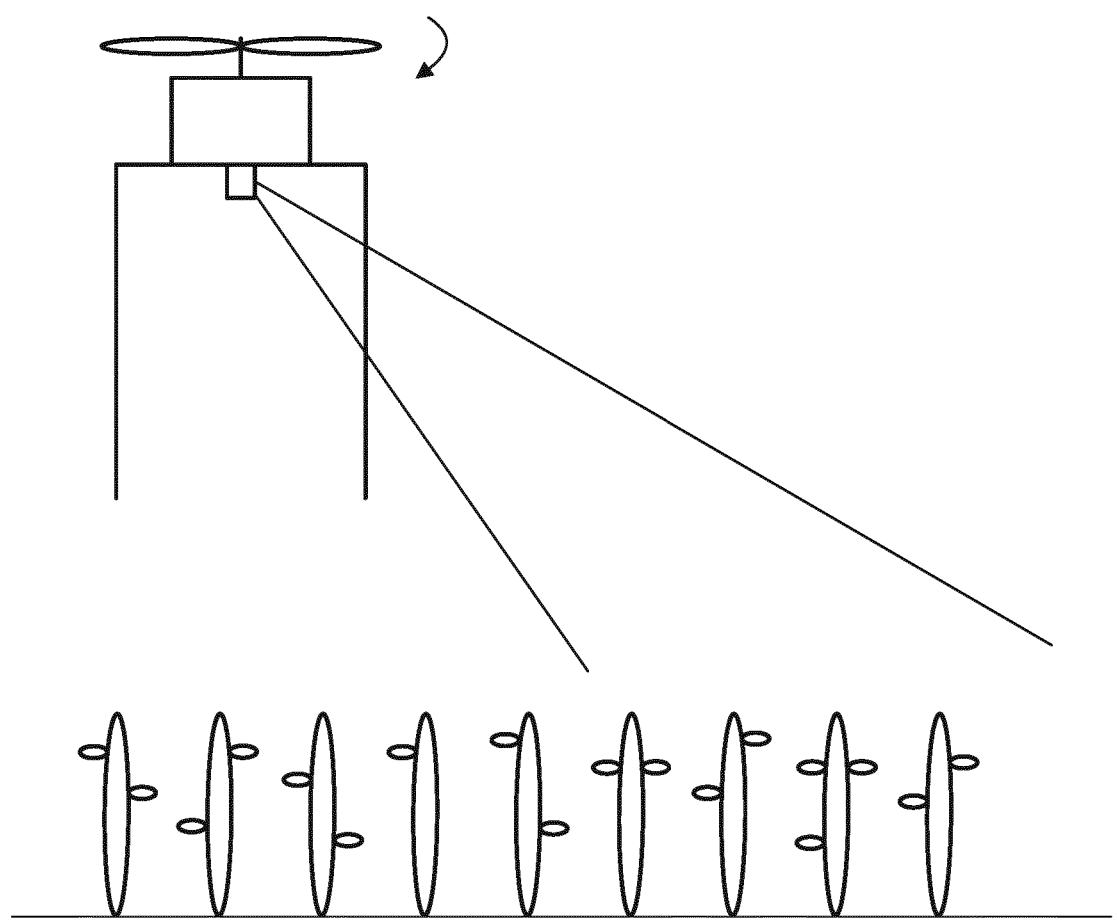
FIG. 4 shows a schematic representation of a detailed example of the unmanned aerial vehicle of FIG. 1.
Figure 5:
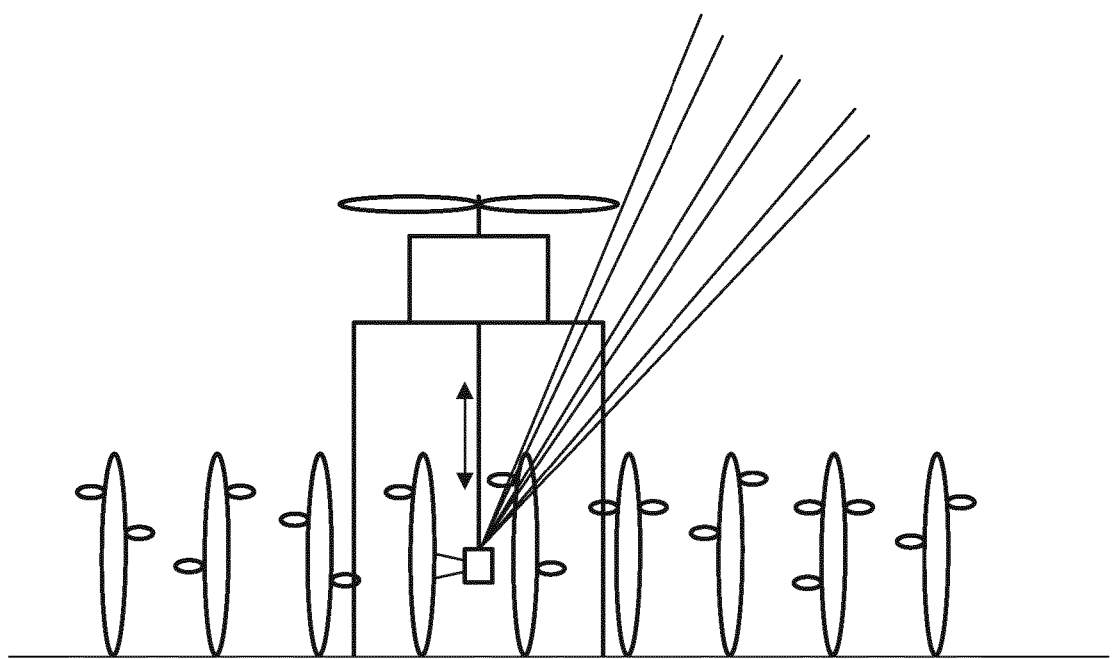
FIG. 5 shows a schematic representation of a detailed example of the unmanned aerial vehicle of FIG. 1.

The unmanned aerial vehicle for agricultural field assessment and method for agricultural field assessment are now described in with respect to FIGS. 3-5, relating to an embodiment of the UAV that has comprehensive functionality, not all of which is essential.

FIG. 3 shows a schematic representation of a rectangular field with a crop (not shown), with FIG. 4 showing the UAV flying over the crop and acquiring imagery. What is shown is a grid of solid dots indicating locations to which the UAV will fly, position itself in a substantially stationary aspect above that location, lower its camera and acquire imagery. The schematic "map" shown in FIG. 3 has been generated by the UAV itself, through processing of acquired imagery, where that imagery is being acquired in FIG. 4. This processing used edge detection to determine the boundaries of the field, which is not necessary if the information relating to the positions of the field boundaries has been uploaded to the UAV, for example as a series of GPS coordinates. This particular UAV lands in order to acquire imagery, and the control (processing) unit of the UAV that controls its flight and the camera, also processes the imagery. The processing unit on the basis of the acquired imagery determines the grid where to land. The grid in this example, has been determined to be 20 m×20 m. The processing unit carries out image processing of acquired imagery, and has determined that a part of the field had a crop that was not normal. The crop was not the same colour as the rest of the crop, and the plants at this part of the field were slightly stunted. Therefore, the processing unit determined that the UAV should land at an increased fidelity level of acquiring imagery at a grid spacing of 5 m×5 m over this part of the field. The UAV can first fly over the field and determine the landing positions, or can start in one part of the field and gradually fly over and land at an appropriate level of fidelity based on the image processing. The grid of where to land, can however be determined through remote sensing for example from satellite imagery or from imagery acquired from another UAV or drone, or a farmer can input to the UAV the fidelity of a grid where image data should be acquired (20 m×20 m, or 15 m×15 m, or 20 m×15 m etc).

FIG. 5 shows the UAV that has landed at one of the locations. The UAV has landed on three carbon fibre legs, where only two are shown. The legs are 1 m long, which enables the body of the UAV to sit above the canopy of the crop. The camera that acquired the imagery discussed with respect to FIGS. 3-4, is actually attached to the bottom of the body of the UAV. The camera housing has a structure that is designed to be "snag free" such that it can be lowered into crop and not snag on the plants of the crop. Thus it has minimal corners, and the top has a slight roof like structure with an apex in the centre of the top, such that when being raised within the crop the camera will not snag. A communication and control cable is attached to the camera, and this is let out to the lower the camera. The length of cable let out is known, and the camera has an inertial sensor to detect movement. Thus the processing unit can determine the distance of the camera from the body of the UAV and taking into account the length of the legs can determine the height of the camera above the ground. Also, when the camera is not moving vertically downwards, and the cable is still being laid out the processing unit can determine that the camera has reached the ground. This confirms the determination of the ground position from the length of the legs, and can also take into account the UAV landing on the crop and thus being more than 1 m above the ground, or landing on soft ground and being slightly less than 1 m above the ground due to the legs sinking into the ground. The processing unit can also make a determination that the camera is snagging on vegetation at that location, because the camera is significantly more than 1 m above the ground, but is not moving downwards as cable is being let out. If sufficient imagery has not been acquired at that location, the processing unit can abort and the UAV takes off, and lands again to one side of where it previously landed. The UAV has a GPS, enabling the position of the UAV to be logged in association with imagery acquired at a location. The UAV also has inertial navigation sensors, based on laser gyros, which are used to augment the accuracy of the GPS derived locations. The inertial navigation sensors are zeroed when the UAV is located at its docking/charging station and the relative movement from that location can be determined. The UAV can however have just the GPS or the inertial navigation system, and indeed can process imagery to render a synthetic landscape from which its position can be determined without recourse to a GPS or inertial navigation system.

The camera has several image sensors.

The camera has an image sensor that can focus at 3-50 m and this is used to acquire the imagery of the field discussed above with respect to FIGS. 3-4 for determining where to land.

The camera also has an upward looking "fisheye" sensor. This sensor is housed in the top of the camera and acquires imagery useable to determine a LAI. The sensor need not be housed in the top of the camera, and can be in the side of the side of the camera. Indeed, there can be more than one imaging sensor that is acquiring the imagery. The sensor acquires imagery substantially over 360 degrees (centred around the vertical) and over a number of angles to be used for determining an LAI. When, the sensor(s) are located in the side of the camera a number of different sensors are used to acquire this imagery. The number of angles can be 3, 4, 5, 6, 7 etc. In FIG. 5, for simplicity, the camera is shown acquiring imagery over 3 sets of angles and only at one position. But, the camera is actually acquiring imagery over 5 sets of angles and over substantially 360 degrees as discussed above, and as such the sets of angles as shown in FIG. 5 are in effect rotated about the vertical to provide a series of solid angle at different angles to the vertical over which imagery is acquired. The sensor acquires imagery at wavelengths less than 500 nm, because vegetation has minimal transmittance over these wavelengths and this imagery is best suited for the determination of LAIs. However, the sensors can operate at different wavelengths. The camera acquires imagery before it enters the crop canopy and acquires imagery at different heights including that on the ground, and from this imagery LAIs for the crop at that location can be determined. Not all of this imagery needs to be acquired. Reference has been made above to a document and website with respect to calculation of an LAI, and the skilled person can refer to this or other state of the art material relating to LAI determination in order to process the acquired imagery.

The camera also has 4 sideways looking, "normal" imaging sensors, where in FIG. 5 only one is shown imaging vegetation to the left of the camera. The sensors are angularly spaced at 90 degree intervals around the camera, and enable the crops all around the camera to be imaged. However, there need only be one, two or three sensors. The sensors can focus at relatively short distances 5 cm-100 cm. The sensors acquire high resolution imagery of the vegetation, which also enables insects to be imaged and then identified. The sensors operate over the visible wavelength range and into the near infrared, and provide hyperspectral imagery in that data over different wavelength ranges can be differentiated from each other, and in this manner over the visible range the sensors are in effect providing RGB data. This image data, over this (defined) wavelength range and at this resolution is then suitable for processing by an image processing algorithm to determine if the plant is a weed, and/or in the crop has a disease, pest, insect damage, and what insects are present.

In the UAV shown in FIG. 5, the image processing is carried out by the processor of the UAV that is also controlling its flight and the cameras. In this way, a fully autonomous system is provided. When the UAV flies back to a docking station for charging, the data relating to the field is downloaded and made available to the farmer. However, the UAV can transmit the analysed data to the farmer in real time, such that at the position where the drone has just landed the farmer is provided with information, such as LAI, and whether there are weeds, insect damage, diseases, pests immediately for that location. The UAV can also transmit the acquired imagery to a remote processor, that carries out the image analysis to determine LAIs and whether there are weeds, insect damage, diseases, pests, and in this way the UAV does not have to be as sophisticated and is less expensive and less power hungry, and the on-board processing and power consumption is reduced, although power is used through data transmission.

In the above detailed example, three sets of imaging sensors of the camera are described: i) for imaging the field; ii) for acquiring image data useable to determine a LAI and iii) for acquiring image data useable to determine if there are weeds, disease, pests, insects, insect damage. However, the same sensor can be used for ii) and iii), and indeed if required the same sensor can be used for i), ii) and iii), for example when a variable focus capability is employed.

Image Processing to Enable Analysis to Determine a Weed Type

A specific example of how an image is processed, and determined to be suitable for image processing in order that a type of weed can be determined is now described:

1. A digital image—in particular a colored image—of a weed is captured.
2. Areas with a predefined color and texture within the digital image are contoured within a boundary contour. Typically, one may expect one contoured area from one weed plant. However, there may also be more than one contoured area from different, potentially not connected leafs, from two weed plants, or the like.—Such a detection or determining process detects boundaries of green areas of the digital image. During this process at least one contoured area—e.g., one or more leafs, as well as one or more weed plants—may be built comprising pixels relating to the weed within a boundary contour. However, it may also be possible, that the digital image has captured more than one leaf and/or the stem. Consequently, more than one contoured area may be determined.
3. Determining if the boundary contour covers a large enough area, and determining a sharpness (e.g. degree of focus) of the image data within the boundary contour. This firstly ensures that there will be sufficient image data upon which a determination can be made as to the type of weed, and secondly determines that a minimum quality of the digital image will be satisfied in order that the type of weed can be made.
4. If both criteria in 3) are satisfied, the digital image, and specifically that within the boundary contour is sent to the processing unit for image analysis by the artificial neural network to determine the type of weed as described above.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are recited in mutually different dependent claims does not indicate that a combination of these measures cannot be used to advantage. Any reference signs in the claims should not be construed as limiting the scope.

The invention claimed is:

1. An unmanned aerial vehicle (10) for agricultural field assessment, comprising:
a control unit (20); and
a camera (30);

wherein, the camera is configured to be moved vertically with respect to a body (40) of the unmanned aerial vehicle between a first position and a second position, wherein the first position is closer to the body of the unmanned aerial vehicle than the second position;

wherein, the control unit is configured to fly the unmanned aerial vehicle to a location in a field containing a crop;

wherein, the control unit is configured to position the body of the unmanned aerial vehicle in a substantially stationary aspect above the crop at the location;

wherein, when the body of the unmanned aerial vehicle is in the substantially stationary aspect above the crop at the location, the control unit is configured to move the camera vertically between the first position and the second position;

wherein the control unit is configured to determine a distance the camera moved vertically between the first position and the second position;

wherein, when the body of the unmanned aerial vehicle is in the substantially stationary aspect above the crop at the location, the control unit is configured to control the camera to acquire at least one image relating to the crop when the camera is not in the first position;

wherein the distance the camera moved vertically between the first position and the second position is used to determine a leaf area index for the crop; and wherein the at least one image relating to the crop comprises at least one image acquired when the camera is within a canopy of the crop.

2. Unmanned aerial vehicle according to claim 1, wherein the at least one image comprises a plurality of images and wherein the control unit is configured to control the camera to acquire the plurality of images at a corresponding plurality of different positions that are not the first position.

3. Unmanned aerial vehicle according to claim 1, wherein the control unit is configured to control the camera to acquire at least one image of the at least one image relating to the crop when the camera is in the second position.

4. Unmanned aerial vehicle according to claim 2, wherein the second position comprises the ground.

5. Unmanned aerial vehicle according to claim 1, wherein the control unit is configured to control the camera to acquire at least one image relating to the crop when the camera is in the first position.

6. Unmanned aerial vehicle according to claim 1, wherein a processing unit (50) is configured to analyse the at least one image to determine the leaf area index for the crop.

7. Unmanned aerial vehicle according to claim 1, wherein a processing unit (60) is configured to analyse the at least one image to determine at least one weed, and/or determine at least one disease, and/or determine at least one pest, and/or determine at least one insect, and/or determine at least one nutritional deficiency.

8. Unmanned aerial vehicle according to claim 6, wherein the unmanned aerial vehicle comprises the processing unit (50) and/or the processing unit (60).

9. Unmanned aerial vehicle according to claim 1, wherein the unmanned aerial vehicle comprises at least one leg (70), and wherein the control unit is configured to land the unmanned aerial vehicle on the at least one leg at the location to position the body of the unmanned aerial vehicle in a substantially stationary aspect above the crop at the location.

10. Unmanned aerial vehicle according to claim 1, wherein the unmanned aerial vehicle is configured to operate in a hover mode, and wherein the control unit is configured to hover the unmanned aerial vehicle at the location to position the body of the unmanned aerial vehicle in a substantially stationary aspect above the crop at the location.

11. Unmanned aerial vehicle according to claim 6, wherein the camera when in the first position is configured to acquire at least one image relating to the field and/or a second camera (80) of the unmanned aerial vehicle is configured to acquire the at least one image relating to the field, and the processing unit is configured to analyse the at least one image relating to the field to determine the location in the field.

12. Unmanned aerial vehicle according to claim 1, wherein the unmanned aerial vehicle comprises location determining means (90).

13. A method (200) for agricultural field assessment, comprising:
  a) flying (210) an unmanned aerial vehicle to a location in a field containing a crop;
  b) positioning (220) a body of the unmanned aerial vehicle in a substantially stationary aspect above the crop at the location;
  c) moving (230) a camera of the unmanned aerial vehicle vertically with respect to the body of the unmanned aerial vehicle between a first position and a second position, wherein the first position is closer to the body of the unmanned aerial vehicle than the second position;
  d) determining a distance the camera moved vertically between the first position and the second position;
  e) acquiring (240) by the camera at least one image relating to the crop when the camera is not in the first position, wherein the at least one image relating to the crop comprises at least one image acquired when the camera is within a canopy of the crop; and
  f) determining a leaf area index for the crop using the distance the camera moved vertically between the first position and the second position.

14. A computer program element stored on a non-transitory computer-readable medium for controlling an unmanned aerial vehicle, which when executed by a processor is configured to carry out the method of claim 13.

\* \* \* \* \*